United States Patent

[11] 3,623,637

[72] Inventor Marion F. Miller
Villa Park, Ill.
[21] Appl. No. 888,238
[22] Filed Dec. 29, 1969
[45] Patented Nov. 30, 1971
[73] Assignee Teletype Corporation
Skokie, Ill.

[54] VACUUM CHUCK AND METHODS OF TRANSFERRING WORKPIECES
15 Claims, 7 Drawing Figs.

[52] U.S. Cl. .................................................. 221/211,
302/2
[51] Int. Cl. .................................................. B23q 7/04
[50] Field of Search ...................................... 302/2;
29/203 U; 294/64; 214/1 BS (2); 221/261, 211

[56] References Cited
UNITED STATES PATENTS
3,534,140  12/1950  Moore .......................... 302/2
2,544,165  3/1951   Krasnow ....................... 302/2
3,301,284  1/1967   Clapp .......................... 302/2

Primary Examiner—Richard E. Aegerter
Assistant Examiner—H. S. Lane
Attorneys—J. L. Landis and R. P. Miller ABSTRACT: A workpiece is drawn by vacuum through a passage in a housing and into a chamber into which a chuck having a bore through its length and a workpiece engaging end is slidably extended. The end of the workpiece which enters the chamber last is drawn by vacuum into, and held within, the bore at the workpiece engaging end of the chuck. The chuck, and therefore the workpiece, is then advanced through a gate in a second passage to the outside of the housing to deliver the workpiece to a workpiece-receiving tool. The chuck is then retracted in preparation for the next operation.

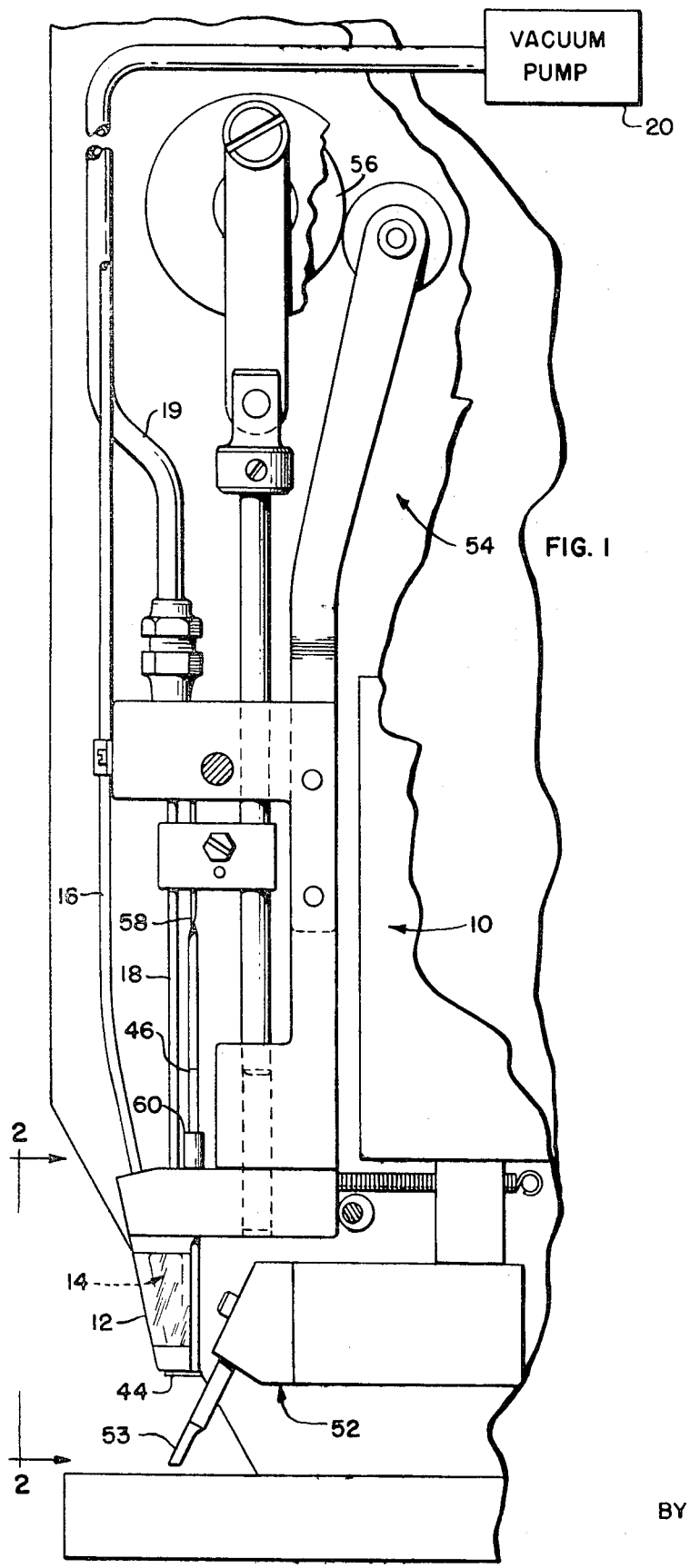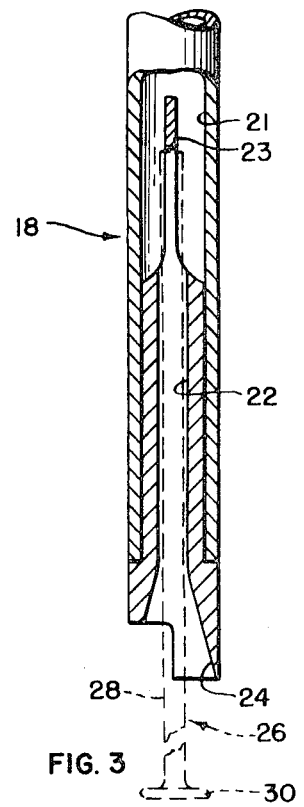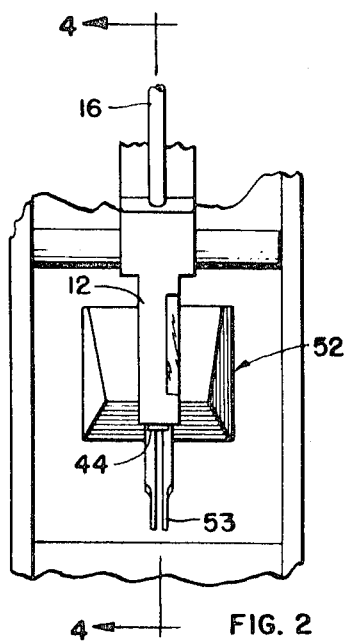

PATENTED NOV 30 1971 3,623,637

VACUUM CHUCK AND METHODS OF TRANSFERRING WORKPIECES

BACKGROUND OF THE INVENTION

The present invention relates generally to vacuum chucks and to methods of transferring workpieces to vacuum chucks, and in particular to a vacuum chuck in which a workpiece is drawn by vacuum through a passage into a chamber and then into a chuck which has been slidably extended into the chamber, which then operates to transfer the workpiece to a workpiece-receiving tool.

Generally, in placing a workpiece in a vacuum chuck, a mechanical device is used to hold the workpiece and to position it within the range of influence created by a vacuum drawn through the chuck so that, when the workpiece is released by the mechanical device, it will be drawn into, and held within, the chuck by the vacuum. This type of vacuum chuck is not practical when the workpieces to be handled are fragile and susceptible to being easily damaged when grasped by mechanical means, such as when the workpieces are conductive leads which must be placed against, and welded to, a thin film circuit. Also, the necessary complexity of the mechanical workpiece handling device results in increased tool expense and frequent maintenance.

An object of the invention is to provide a vacuum device for placing workpieces within a vacuum chuck, wherein the workpieces are not grasped by mechanical means, to prevent damage to the workpieces.

Another object of the invention is to provide a relatively inexpensive and maintenance free device for guiding workpieces into the workpiece engaging end of a vacuum chuck.

SUMMARY OF THE INVENTION

The foregoing and other objects of the invention are accomplished by providing a housing having a chamber and first and second passages, each passage extending between the outside of the housing and the chamber. A chuck having a bore extending through its length, and having a work engaging end, is slidably mounted in the second passage such that its work engaging end may enter the chamber.

Preferably, the housing has a third passage aligned with the second passage and extending between the outside of the housing and the chamber, and separated from the second passage by the chamber. A movable gate is provided to normally seal the third passage. A workpiece is introduced into the first passage and means are provided for withdrawing air from the bore of the chuck, so that air is drawn from the first passage, through the chamber and into the bore, thereby causing the workpiece to be drawn by the air through the first passage, into the chamber and then into the bore. Both the first and the second passages enter the chamber at the same end of the chamber, and therefore the end of the workpiece entering the chamber last is spaced closer to the second passage, when the workpiece is fully in the chamber, than the end of the workpiece which entered the chamber first, and is drawn into and held within the bore of the chuck at the workpiece engaging end of the chuck by the moving air. Once the workpiece is within the work engaging end of the chuck, the chuck is advanced through the chamber, the third passage, and the movable gate to deliver the workpiece to the exterior of the chamber.

BRIEF DESCRIPTION OF THE DRAWINGS

FIG. 1 of the drawings is a side view of a preferred embodiment of the invention.

FIG. 2 is a partial front view taken along the line 2—2 in FIG. 1.

FIG. 3 is an enlarged, detail view of the work engaging end of the chuck, partly in section.

DETAILED DESCRIPTION

Figure 4:
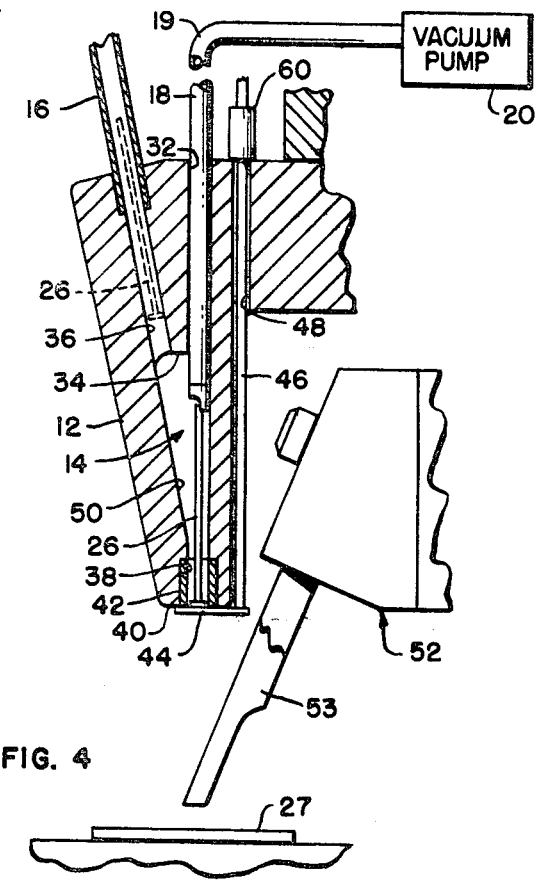
FIG. 4 is a cross-sectional view according to line 4—4 of FIG. 2, showing the attitude of a workpiece which is about to enter the chamber and of a workpiece which has entered the chamber but has not yet been drawn within the bore of the chuck.

The specific embodiment of a workpiece handling device 10 as shown in FIG. 1 of the drawings includes a housing 12 having a chamber 14, better seen in FIG. 4. A workpiece supply tube 16 is connected to the chamber 14 for supplying workpieces to the chamber 14, and a hollow chuck 18 is also extended into the chamber 14 to accept workpieces within the chamber 14 which have been provided through the workpiece supply tube 16. A vacuum conduit 19 is connected between the chuck 18 and a vacuum means 20, such as a vacuum pump, to provide an air flow through the workpiece supply tube 16, the chamber 14, and into the chuck 18 to the vacuum means 20 to move the workpiece through the tube 16, into the chamber 14 and then into the chuck 18. A front view of the housing 12 and the workpiece supply tube 16 is shown in FIG. 2 of the drawings.

Figure 5:
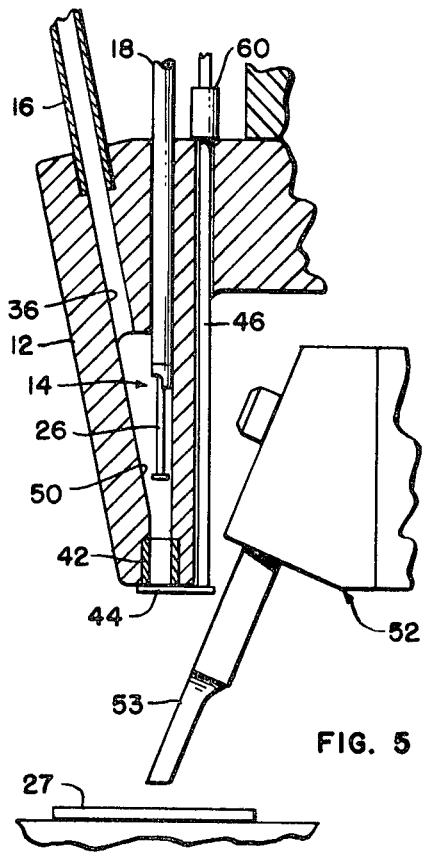
FIG. 5 is similar to FIG. 4, showing a workpiece which has been drawn into, and is being held within, the bore of the chuck.
Figure 6:
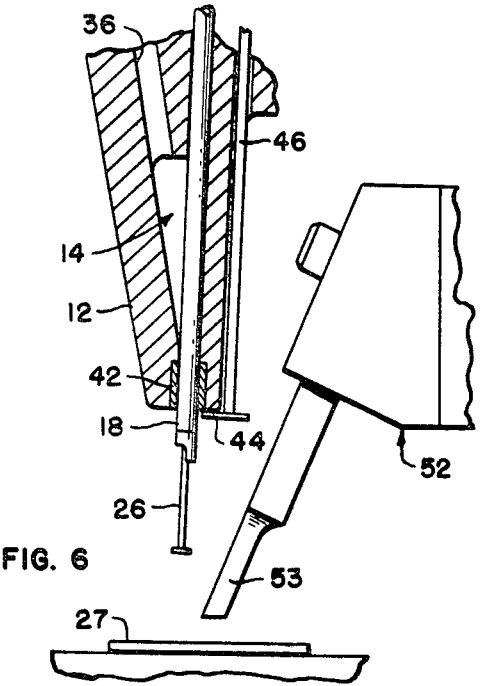
FIG. 6 is a similar view showing the chuck extended through the chamber and out of the housing.
Figure 7:
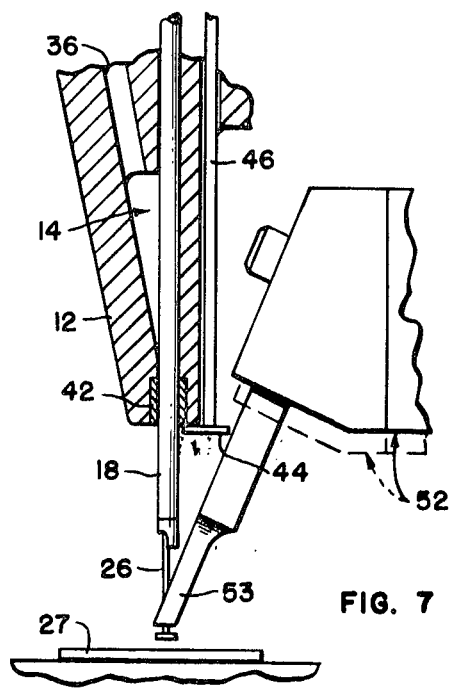
FIG. 7 is another similar view showing the chuck locating the workpiece for engagement by the workpiece-receiving tool.

More particularly the chuck 18, as shown in FIG. 3 of the drawings, is provided with two coaxial bores 21 and 22 extending throughout its length, the bore 22 being of sufficient diameter to allow a workpiece to be brought within it. A blocking member 23 is provided at the juncture of the bore 22 with the bore 21. The bore 22 has a flared opening 24 at its end to facilitate entry of the workpiece into the lower bore 22. In this example, a workpiece 26 is a long, thin conductive lead, a plurality of which are to be welded in sequence to a thin-film circuit 27. Each lead has a cylindrical body 28 and a headed end 30, of a size such that the upper portion of the body 28 may be accommodated closely within the bore 22 of the chuck 18 and seat itself in engagement with the blocking member 23, as illustrated in FIGS. 3 and 5. When properly seated, the headed end 30 of the workpiece 26 extends out of the bore 22 as shown in FIGS. 5-7.

As shown in FIG. 4 of the drawings, the chuck 18 is slidably mounted in a bore 32 of the housing 12 and normally extends partially into the chamber 14 at a top end 34 of the chamber 14, as viewed in the drawings. A passageway 36 also extends at one of its ends into the end 34 of the chamber 14, and is connected at its other end to the workpiece supply tube 16. Therefore, when the vacuum means 20 is operated, air will be drawn through the supply tube 16 and the passageway 36, into the chamber 14, and then upward through the bores 22 and 21 of the chuck 18.

Another passageway 38 is provided, at a bottom end 40 of the housing 12, which is vertically aligned with the bore 22 in the chuck 18 and extends between the outside of the housing 12 and the chamber 14. An elastomer sleeve 42 is circumferentially disposed within the passageway 38 and extends slightly beyond the bottom 40 of the housing 12. The elastomer sleeve 42 is coaxial with, and has a sufficient inner diameter to accommodate, the chuck 18. A gate 44, in the form of a flat planar member, is supported by a rod 46 which extends through, and is rotatably mounted within, a bore 48 in the housing 12. The gate 44 is normally held in engagement with the end of the elastomer sleeve 42 which extends beyond the bottom 40 of the housing 12, and forms an effective seal with the elastomer sleeve 42, so that when air is drawn from the bore 22 of the chuck 18 by the vacuum means 20, air will not also be drawn through the elastomer sleeve 42.

OPERATION

In use, the vacuum means 20 normally provides a continuous airflow under a negative pressure through the workpiece supply tube 16, into the chamber 14, and then through and out of the bores 22 and 21 of the chuck 18. Workpieces, such as the workpiece 26, are introduced one at a time with the headed end first into the workpiece supply tube 16, and are propelled by the airflow generated by the vacuum means 20 through the workpiece supply tube 16 and the passageway 36 in the housing 12 into the chamber 14. When a particular workpiece 26 enters the chamber 14, it is guided down a side 50 of the chamber 14, which has a slope with respect to vertical, as viewed in the drawings, until it enters the elastomer sleeve 42, the axis of which lies in a vertical plane, and momentarily comes to rest against the gate 44. The relative positions of the elastomer sleeve 42 and the side 50 are such that a smooth transition is experienced when the workpiece 26 passes out of engagement with the side 50 and through the passageway 38 into engagement with the gate 44. The diameter and length of the elastomer sleeve 42 are sufficient to ensure that when the workpiece 26 has entered it, the workpiece will be maintained in a substantially vertical position and will, therefore, be approximately coaxial with the chuck 18.

When the workpiece is resting with its headed end 30 against the gate 44, and in a position which is substantially coaxial with the chuck 18, as seen in FIG. 4 of the drawings, it is acted upon by the air being pulled through the bore 22 of the chuck 18 by the vacuum means 20, and is drawn into the bore 22 of the chuck 18, as shown in FIG. 5 of the drawings, until it engages the blocking member 23 formed between the bore 22 and the bore 21. The workpiece 26 is thereafter held firmly by the vacuum chuck 18 until needed. It is to be noted that the end of the workpiece 16 which entered the chamber 14 last is the end which is drawn into the bore 22 of the chuck 18.

With the workpiece 26 held within the chuck 18 as shown in FIG. 5 of the drawings, the gate 44 may be rotated by the rod 46 out of engagement with the elastomer sleeve 42, and the chuck 18 may be advanced downwardly through the elastomer sleeve 42 and externally of the housing 12 to position the workpiece 26 to be received by a workpiece-receiving tool 52, as shown in FIG. 6 of the drawings. The workpiece-receiving tool 52 may be any suitable device, such as a conventional welding device for thin-film circuit leads, having a furcated head 53 for gripping the workpiece 26, as best shown in FIGS. 2 and 7. The gate 44 may be rotated out of engagement with the elastomer sleeve 42, and the chuck 18 may be extended through the elastomer sleeve 42 and externally of the housing 12, by any suitable means, such as a driving device 54 as shown in FIG. 1 of the drawings. As a cam 56 rotates, the chuck 18 is driven downward and a rotary motion is imparted to the rod 46 by a spiral drive 58, downward motion of the rod 46 being prevented by a sleeve 60 which is securely fastened to the rod 46 and which normally engages the top portion of the housing 12.

As the chuck 18 is driven downward to deliver the workpiece 26 to the workpiece-receiving tool 52, as shown on in FIG. 6 of the drawings, the entire device 10 is rotated away from the receiving tool 52 so that the workpiece 26 will be brought under the bottom surface of the receiving tool 52 and between the furcations of the head 53. After the workpiece 26 has been positioned between the furcations of the head 53, the receiving tool 52 is driven downward, allowing the head 53 to engage the headed end 30 of the workpiece 26 and to move the workpiece downward and out of the chuck 18 until the headed end 30 engages the surface of the thin-film circuit 27. Welding of the workpiece 26 to the thin-film circuit 27 is then accomplished and retraction of the chuck 18 and the receiving tool 52 to their original positions, and closure of the gate 44, prepares the device 10 for another workpiece receiving operation as described above.

While one specific embodiment of the invention has been described in detail, it will be obvious that various modifications may be made from the specific details described without departing from the spirit and scope of the invention.

I claim:

1. A device for transferring and handling a workpiece, which comprises:

a housing having a chamber and first and second passages, each passage extending between the outside of the housing and the chamber;

a workpiece holder movably mounted in the second passage with its inner, workpiece-receiving end extending toward the chamber;

means for conveying the workpiece through the first passage and into the chamber with a leading end of the workpiece foremost and a lagging end hindmost and into engagement with the holder with the lagging end foremost; and means for moving the holder in the second passage to position at least a portion of the workpiece outside the chamber.

2. A device as recited in claim 1, wherein:

the housing has a third passage of sufficient size to slidably receive the workpiece and the inner end of the holder, the third passage extending between the outside of the housing and the chamber, and being aligned with the second passage and separated from the second passage by the chamber;

the holder-moving means operates to move the inner end of the holder through the third passage to carry a portion of the workpiece outside the chamber; and means are provided for sealing the third passage prior to the time that the workpiece engages the holder, and for opening the third passage thereafter to permit movement of the holder therethrough.

3. A device as received in claim 1, for use with an elongated, generally cylindrical article, wherein:

the first passage is a cylindrical passage arranged to feed the article longitudinally therethrough and entirely into the chamber; and a receiving member is mounted in the chamber in line with the inner end of the first passage for receiving the article after it passes through the first passage and for orienting the article to a position in alignment with the inner end of second passage, after which the conveying means moves the article into the second passage and into engagement with the holder.

4. A device for transferring and handling an article, which comprises:

a housing having a V-shaped passage of a cross section sufficient to pass the article, the article being introduced into the outer end of a first arm of the V, the base of the V being closed and of sufficient size to pass the article from one arm to the other;

means for withdrawing air from the second arm of the V to establish an airflow through the first arm sufficient to advance the article along the first arm to the base of the V and then outward along the second arm; and means located in the second arm for engaging and holding the article as it moves along the second arm.

5. A device as received in claim 4, wherein:

the passage is Y-shaped; and means are provided at the base of the Y for receiving the article from the first arm and for orienting the article into an aligned position facing the inner end of the second arm.

6. A device as received in claim 5, for use with an elongated cylindrical article, wherein:

the first arm is a cylindrical passage arranged to feed the article longitudinally completely therethrough and into the base leg of the Y;

the base leg includes a member having a closed cylindrical passage constituting the receiving and orienting means, arranged to receive the article from the first passage and temporarily hold it with the end which entered the first arm last facing the second arm in alignment therewith; and the second arm includes a cylindrical passage designed to receive the originally trailing end of the article; and a vacuum chuck is mounted in the second arm for receiving and holding the originally trailing end of the article.

7. A device as recited in claim 6, further comprising:
means for moving a portion of the vacuum chuck through the base leg of the Y to transport the originally trailing end of the article outside of the housing.

8. A method of transferring and handling a workpiece, which comprises:
conveying the workpiece through a housing having a chamber and first and second passages, each passage extending between the outside of the housing and the chamber, so that the workpiece advances through the first passage and into the chamber with a leading end of the workpiece foremost and a lagging end hindmost and then into the second passage with the lagging end foremost;
engaging the workpiece as it advances into the second passage and holding it with a workpiece holder movably mounted in the second passage with its workpiece-receiving end extending toward the chamber; and
moving the holder in the second passage to position at least a portion of the workpiece outside the chamber.

9. A method as received in claim 8 wherein:
the step of moving the holder comprises moving the holder through a third passage provided in the housing in alignment with the second passage and separated from the second passage with the chamber; and
the third passage is sealed prior to the time that the workpiece engages the holder and is opened thereafter to permit movement of the holder therethrough.

10. A method as recited in claim 7, for use with an elongated generally cylindrical article, wherein:
the article is fed longitudinally through the first passage and advances entirely into the chamber; and
the article is oriented after it has advanced into the chamber to a position in alignment with the inner end of the second passage, after which the article is conveyed into the second passage and into engagement with the holder.

11. A device for transferring and handling a workpiece, which comprises:
a housing having a chamber and first and second passages, each passage extending between the outside of the housing and the chamber;
a chuck movably mounted in the second passage with its inner, workpiece-receiving end extending toward the chamber and having a bore extending through its length and designed for receiving a portion of the workpiece, the bore having means therein for stopping the workpiece in a desired position;
means for withdrawing air from the bore of the chuck so that air is drawn from the first passage, through the chamber, and then through the bore in the chuck to feed the article by vacuum in sequence through the first passage, the chamber, and then the bore to a rest position within the chuck;
a third passage in the housing of sufficient size to slidably receive the workpiece and the chuck, the third passage extending between the outside of the housing and the chamber, and being aligned with the second passage and separated from the second passage by the chamber;
means for moving the chuck in the second passage so that the lower end of the chuck passes through the third passage to carry at least a portion of the workpiece outside the chamber; and
means for sealing the third passage prior to the time that the workpiece engages the chuck, and for opening the third passage thereafter to permit movement of the chuck therethrough.

12. A device for transferring and handling an elongated, generally cylindrical article, which comprises:
a housing having a chamber and first and second passages, each passage extending between the outside of the housing and the chamber, the first passage having a cylindrical shape and being arranged to feed the article longitudinally therethrough and entirely into the chamber;
an article holder movably mounted in the second passage with its inner, article-receiving end extending toward the chamber;
means for exhausting air from the second passage to draw the article by suction through the first passage, into the chamber, and then into the second passage for engagement with the article-receiving end of the holder, the exhausting means and the passages being arranged so that the portion of the article which enters the chamber last approaches the holder first;
a receiving member mounted in the chamber in line with the inner end of the first passage for receiving the article after it passes through the first passage and for orienting the article to a position in alignment with the inner end of the second passage, after which the air exhausting means moves the article into the second passage and into engagement with the holder; and
means for moving the holder in the second passage to position at least a portion of the workpiece outside the chamber.

13. A device as recited in claim 12, wherein the chamber and passages are arranged in a Y-shaped configuration, the first and second passages comprising the arms of the Y and the chamber comprising the base leg, the receiving member being located at the base of the Y.

14. A device as recited in claim 13, wherein:
the base leg of the Y comprises a third passage aligned with the second passage, the third passage being sufficiently large to slidably receive the article and the inner end of the holder;
a movable gate is provided at the base of the Y for sealing the third passage while the article is being transferred to the holder;
means are provided for opening the gate when it is desired to remove the article from the chamber; and
the holder-moving means comprises means for moving the holder so that the work-receiving end passes through the third passage to carry a portion of the article outside the housing.

15. A method of transferring and handling a workpiece, the workpiece being transferred through a housing having a chamber and first, second and third passages, each passage extending between the outside of the housing and the chamber, which comprises:
withdrawing air from the second passage and from a bore in a holder movably mounted in the second passage, so that air is drawn from the first passage, through the chamber and then through the bore in the holder to feed the workpiece by vacuum in sequence through the first passage, the chamber, and to a rest position within the holder;
moving the holder in the second passage and through the third passage, the third passage being in alignment with the second passage and separated from the second passage with the chamber, to position at least a portion of the workpiece outside the chamber; and
sealing the third passage prior to the time that the workpiece engages the holder and opening the third passage thereafter to permit movement of the holder therethrough.

* * * * *